(12) United States Patent
Shteyngarts et al.

(10) Patent No.: US 7,912,809 B2
(45) Date of Patent: Mar. 22, 2011

(54) DATA MANAGEMENT SYSTEM FOR MANUFACTURING ENTERPRISE AND RELATED METHODS

(76) Inventors: Gregory Shteyngarts, Solon, OH (US); Malgorzata Shteyngarts, Solon, OH (US)

( * ) Notice: Subject to any disclaimer, the term of this patent is extended or adjusted under 35 U.S.C. 154(b) by 384 days.

(21) Appl. No.: 11/967,213

(22) Filed: Dec. 30, 2007

(65) Prior Publication Data

US 2009/0172023 A1      Jul. 2, 2009

(51) Int. Cl.
*G06F 7/00* (2006.01)
(52) U.S. Cl. ...................................................... 707/603
(58) Field of Classification Search .................. 707/634, 707/603
See application file for complete search history.

(56) References Cited

U.S. PATENT DOCUMENTS

| | | | |
|---|---|---|---|
| 5,260,878 A | 11/1993 | Luppy | |
| 5,974,992 A | 11/1999 | Asano | |
| 6,034,681 A | 3/2000 | Miller | |
| 6,163,761 A | 12/2000 | Kent | |
| 6,950,714 B2 | 9/2005 | Bickley | |
| 7,054,704 B2 | 5/2006 | Bickley | |
| 7,263,689 B1 | 8/2007 | Edwards | |
| 7,265,755 B2 | 9/2007 | Peterson | |
| 7,269,795 B2 | 9/2007 | Whittenberger | |
| 2004/0080536 A1 | 4/2004 | Yakhini | |
| 2004/0143811 A1* | 7/2004 | Kaelicke et al. | 717/101 |
| 2004/0236655 A1* | 11/2004 | Scumniotales et al. | 705/36 |
| 2006/0004584 A1 | 1/2006 | Knight | |
| 2006/0116937 A1* | 6/2006 | Seaman et al. | 705/29 |
| 2007/0027898 A1 | 2/2007 | Jones | |
| 2007/0146784 A1 | 6/2007 | Perry | |

* cited by examiner

*Primary Examiner* — Pierre M Vital
*Assistant Examiner* — Truong V Vo
(74) *Attorney, Agent, or Firm* — Leonid Khodor

(57) ABSTRACT

A method, system, and interface for managing data in a manufacturing enterprise that provides a visual indication of projected results of currant activities. Method includes collecting multi-dimensional data comprising planned values and dynamically updated actual values, processing the values, projecting future events based on records of present and past events and comparison between the planned values and the processed actual values, and displaying an extrapolated status report indicating discrepancies between the planned values and the actual values. The system includes the interface comprising dynamically updated two-dimensional graphic display, a first dimension attribute corresponding to a preset interval of first dimension value from a present first dimension value onward, an array of second dimension attributes, sets of feature attributes that are associated with the second dimension attributes and presented as data in graphic or alphanumeric forms. The sets are located substantially within boundaries of the second dimension attributes.

16 Claims, 4 Drawing Sheets

FIG. 3

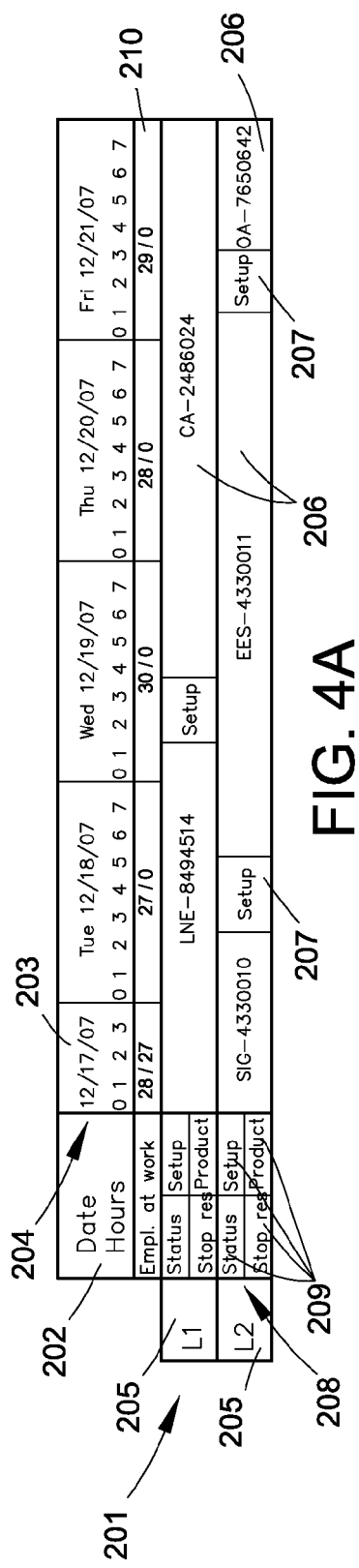
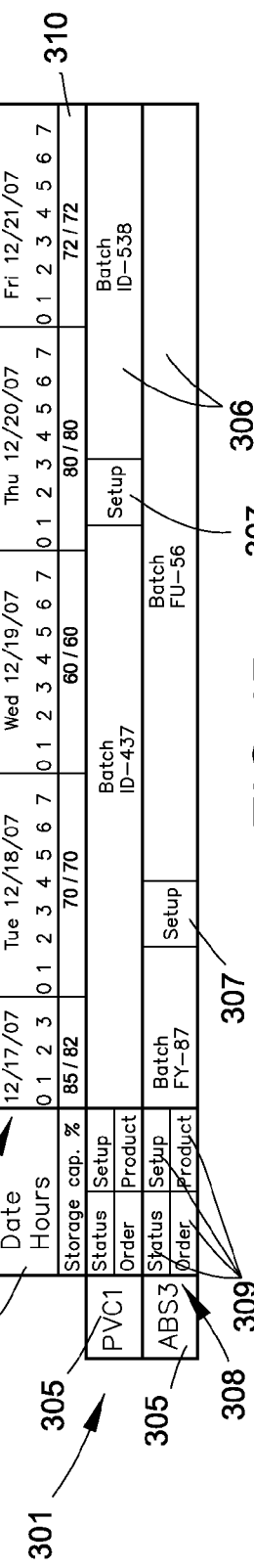
FIG. 4A
FIG. 4B
FIG. 4C

DATA MANAGEMENT SYSTEM FOR MANUFACTURING ENTERPRISE AND RELATED METHODS

BACKGROUND OF THE INVENTION

The present invention relates to methods and systems for presenting multi-dimensional data in an integrated computing environment and, in particular, to methods, systems, and devices for dynamically determining and presenting extrapolations of multi-dimensional data related to manufacturing processes.

Computer-implemented integrated production management systems are increasingly being used in manufacturing enterprises. Such systems, often referred to as "supply chain management", model the enterprise environment and provide for planning of producing items to fulfill market demand within the constraints of the environment.

In a simplest sense, the supply chain is a process of creating products for consumption. Generally, supply chains span from raw materials to manufacturing, distribution, transportation, warehousing, and product sales, involving a number of enterprises before a product reaches a customer. Thus, a data management system for a single manufacturing enterprise within a supply chain typically includes interactions with preceding and subsequent stages of the same chain in order to provide for an accurate representation of the manufacturing process.

Manufacturing enterprises generally rely on a variety of tools and procedures to control and analyze production and business operations, such as material and resource inventories, production capacities, production and maintenance scheduling, process/production unit (machine, work cell, process line) performance monitoring on one hand and accounting, payroll, human resources, employee tracking, customer relations tracking on the other. These procedures reflect different functions, aspects or "dimensions" of the business operation and, accordingly, often rely on multi-dimensional data.

Tools which provide these functions are typically implemented using computer software. For example, one software package may manage business accounting, another software package might be responsible for receiving and processing new orders, yet another software package will track warehouse inventory and still other packages may handle order fulfillment and shipment. Furthermore, a business software package operated by one business may need to exchange data with a software package operated by another business to facilitate a business-to-business transaction. Integration applications have been developed which are used to integrate various elements of one business application with elements of another business application.

One of many consequences of the increasing computerization of production and business operations is generation of vast quantities of complex multi-dimensional data. While capturing multiple aspects of the business activities is becoming easier, comprehending data so acquired is increasingly challenging. Because of the complexity of the supply chain management, it is important to present information to the user in a comprehensible manner. Good presentations are vital to the usefulness of the supply chain management tools.

Abstract data used in business and technical pursuits commonly consists of categories, rankings, and real value measurements gathered by people and machines. A number of conventional techniques for organizing, summarizing, and presenting such data, for example, tables, statistics, and graphics, have been developed. Conventional techniques have also been developed for organizing the storage and retrieval of such data such as hierarchical, relational, and object-oriented databases as well as non-database methods such as "flat" files, spreadsheets, or other data structures. Collecting, storing and accessing data, however, is only the beginning of process of turning raw (abstract) data into valuable information.

Database management systems provide basic database operations, such as storage and retrieval of records based upon selection criteria or filters. Analytical software enables other more advanced types of database operations. Basic operations include entering, updating, deleting and retrieving sets of data from the database. More advanced operations include creating new attributes by transforming original attributes or aggregating sets of attributes or records.

Comprehending data by the user involves reducing the data to a series of visualizations or other kinds of mental representations, often fitting these representations into a pre-existing model. The model abstracting the data enables the user to make decisions and take or avoid actions based on the model and the user's projection of its consequences. Such approach necessarily simplifies the data. The same data may support several different models based on differing presuppositions.

The major activities of a data analyst/user, common in managing of any business, may be characterized by model fitting or data exploration. In model fitting, a predefined model exists and the data is used to calculate or pick the parameters of the model, for example, to predict outcomes. In data exploration, visual methods are often used to summarize the data with a goal of identifying an appropriate model. In practice, especially for highly dimensional data, both activities are performed iteratively with models being selected and fit and then discarded for a new model as understanding of the data set improves. The pace at which this process can proceed is limited by the availability of visualization tools that aid the data analyst in perceiving the data.

A combination of database operations and graphical display techniques is used to build an intuitive "feel" for data, examine how well putative models perform, identify database errors, and examine relationships among data subsets. Graphical representation tools are very useful in maintaining and analyzing data. Most graphic user interfaces allow applications to establish dynamic data links for exchanging data between applications. Typically, these links allow changes in one application to be immediately reflected in other applications.

Even using the combination of complex database operations and graphical display techniques, it is difficult to gain an understanding of highly distributed multi-dimensional data because there are simply too many values to mentally track or plot. Thus, these types of data are typically reduced using data transformations to a form that can be displayed with conventional graphical methods. For example, transforming data by aggregating across variables reduces data dimensionality by creating new variables that summarize several original variables. As a specific example, sales and expenses may be recorded in a database, whereas the difference of the two representing a profit or loss may be more meaningful in a business model and can serve to reduce the amount of data being viewed.

Such user interfaces are typically custom solutions which must be specifically coded for each integration application. Moreover, the multi-dimensional data need to be displayed in meaningful ways, so the users that differ in fields of expertise, duties, capacities, and comprehension could interact within the system and communicate successfully with each other to attain common goals. In existing systems, there are a number of graphical formats used to display data two or more attributes at a time. In these formats time or another index attribute is displayed as one coordinate in a static display. The exponential growth of the computer processing power available for data modeling and graphical data exploration is used by current tools merely to display larger data sets faster. Thus, known data visualization techniques continue to present a number of limitations.

Therefore it would be desirable to provide a user-friendly data management system for manufacturing enterprise capable of visually representing projected results of current activities in a manner that is comprehensible to a number of users.

SUMMARY OF THE INVENTION

The present invention generally focuses on improved method, system, and interface for managing data in a manufacturing enterprise that is equally comprehensive to users that differ in fields of expertise, duties, and experiences and provides the visual indication of projected results of current activities. Moreover, in its various embodiments and implementations, the invention presents to the user a "big picture" combined with an access to detailed reports and capabilities to influence the system for achieving planned goals. Furthermore, the present invention facilitates transparent business operations with concurrent multifaceted management solutions, saves time by eliminating unnecessary business meetings, and empowers everyone involved in the particular supply chain.

In general, in one aspect, the method for managing multi-dimensional data in a manufacturing enterprise that includes providing a set of multi-dimensional data comprising planned values and actual values associated with a plurality of actions to be performed within the manufacturing enterprise; in response to performance of the plurality of actions, generating a record of present occurrences of events associated therewith and dynamically updating the actual values; processing the planned and actual values according to predetermined rules; projecting future occurrences of events based on the record of present and past occurrences of events and comparison between the planned values and the processed actual values; and displaying an extrapolated status report indicating discrepancies between the planned values and the processed actual values. Various embodiments and implementations of this aspect of the invention include the following features:

The planned values can be altered in response to the extrapolated status report. Processing of the actual values may occur periodically at regular intervals, and the actual values may include a first subset processed at a first interval and a second subset processed at a second interval different from the first interval. In one embodiment, a historical status report, based on the records of the event occurrences is generated. In another embodiment, at least one integrated attribute reflecting a predetermined objective of the manufacturing enterprise is generated.

In general, in another aspect, the invention relates to a system for managing multi-dimensional data in a manufacturing enterprise that comprises input means for entering multi-dimensional data comprising planned values and actual values associated with a plurality of actions performed within a manufacturing enterprise; computing means for collecting, dynamically updating, and processing the actual values of the multi-dimensional data and, in response to performance of the plurality of actions, generating a record of present occurrences of events associated therewith; at least one database for storing and retrieving the multi-dimensional data and the records of occurrences; means for generating an extrapolated status report projecting future occurrences of events based on the record of present occurrences of events and comparison between the planned values and the processed actual values; and an interface for dynamically presenting the extrapolated status report indicating discrepancies between the planned values and the processed actual values. Various embodiments and implementations of this aspect of the invention include the following features.

The interface associated with the input means and configured to alter the planned values. The input means may include sensors, machine and facility control input and output terminals, and human operators. The interface can be configured to restrict altering of the planned values of the multi-dimensional data based an area of expertise of a user and can be accessible over a network. In some embodiments, the interface displays at least a portion of said extrapolated status report in predetermined colors corresponding to the discrepancies.

In general, in yet another aspect, the system for managing multi-dimensional data in a manufacturing enterprise includes a user interface comprising at least one dynamically updated two-dimensional graphic display; a first dimension attribute corresponding to a preset interval of first dimension value from a present first dimension value onward; an array of second dimension attributes; an array of sets of feature attributes presented as data in graphic or alphanumeric forms, said sets of feature attributes associated with the second dimension attributes and located substantially within boundaries of said second dimension attributes; a plurality of feature displays linked to said feature attributes; and means for navigating the displays and data editing.

The first dimension attribute can be an index attribute associated with activities within the manufacturing enterprise. In some embodiments, the array of second dimension attributes includes a diverse plurality of the second dimensions and the feature attributes generally have identical mapping and presentation forms across said sets of feature attributes associated with a particular variety of said second dimension. The alphanumeric data of said sets of feature attributes can be superimposed over the graphic data of said sets of feature attributes. The two-dimensional graphic display may have a grid having plurality of color-coded rows, each row comprising one of said sets of feature attributes. The second dimension attribute may correspond to a plurality of processes and equipment associated with a predetermined objective within the manufacturing enterprise, to one of plurality of resources consumed and/or recycled within the manufacturing enterprise, and/or to one of a plurality of transactions associated with a predetermined objective within the manufacturing enterprise. At least one integrated attribute may be associated with a predetermined objective of the manufacturing enterprise.

BRIEF DESCRIPTION OF DRAWINGS

FIG. 3 depicts another embodiment of primary screen layout of the user interface.

FIG. 4A depicts a fragment of example of process/equipment primary screen layout of the user interface.

FIG. 4B depicts a fragment of example of material/resource primary screen layout of the user interface.

FIG. 4C depicts a fragment of example of finance primary screen layout of the user interface.

DETAILED DESCRIPTION

Figure 1:
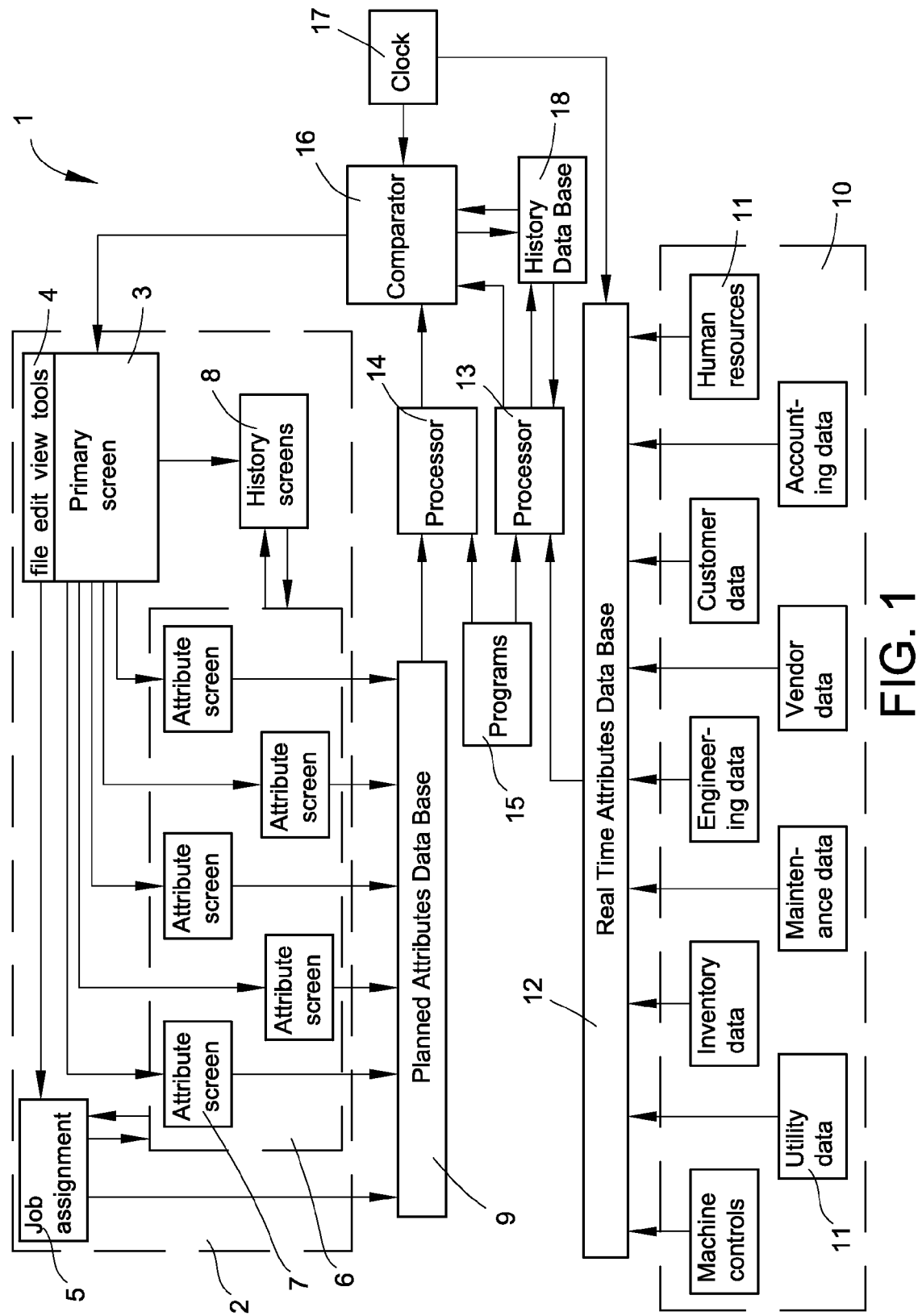
FIG. 1 depicts a block diagram of embodiment of the improved method and system for data management of a manufacturing enterprise.

In its various embodiments, the present invention focuses on a method, a system, and an interface for managing multi-dimensional data in a manufacturing enterprise. Referring to FIG. 1, in one embodiment, a block diagram conceptually represents a system 1 having a user interface 2. The interface 2 includes a primary screen 3 with a header 4, a job assignment screen 5, an attribute interface 6 with multiple attribute screens 7, and history screens 8. A data base of planned attributes 9 collects data from the assignment screen 5 and attribute screens 7. The attribute screens 7 and the history screens 8 are directly accessible from the primary screen 3 while the assignment screen 5 is accessible from the header 4. The attribute screens 7 are also interconnected with the assignment screen 5 and the history screens 8.

For the purpose of current disclosure, term "screen" means a display with means for navigating and editing of information presented to a user by a communication device.

A block of real time data 10 comprises inputs 11 that provide virtually real time data derived from events, generally occurring in all facets of the manufacturing business, into a data base of real time attributes 12. Generally, the inputs 11 represent sensory part of a feedback loop wherein real value measurements enter the system 1. The real value measurements are gathered by machine controls and people.

Various techniques for collecting manufacturing data in real time are well known in the art. For example, practically any machine action in a production environment is a result of output and a source of input signal of the machine control. Both, the input and the output signals from the machine control could be used in the system 1 as the real time values when entered concurrently via known in the art means of communication. Likewise, since material, energy, and human resources are controlled in contemporary manufacturing businesses through a multitude of scales, meters, clocks and accounting one could argue that the businesses already equipped with the means for gathering of real value measurements. Furthermore, an amount of real time data recordable by the existing means is so huge even in a small scale contemporary manufacturing enterprise that it would require careful filtering to have manageable data bases and prevent slowdowns of the system.

The data base of real time attributes 12 communicates data to a processor 13 while the data base of planned attributes 9 communicates with a processor 14. A program block 15 provides work algorithms to the processors 13 and 14. A comparator 16 analyses data provided by the processors 13 and 14 and a history data base 18 in accordance with scan time values provided by a clock 17. The comparator 16 provides generated records to the primary screen 3 of the user interface 2 and to the history data base 18, which, along with the data base of real time attributes 12, communicates with the processor 13. The scan time values generated by the clock 17 define frequencies of real time data acquisitions and synchronize them with the record generating by the comparator 16. Generally, the clock 17 would provide a variety of scan times to accommodate different pace processes by sampling the data according to the particular process pace and, thus, avoiding the system overload.

The records provided by the comparator 16 to the primary screen 3 comprise future event occurrences extrapolated over a user defined time duration, the extrapolation is derived from the planned data, the real time data acquisitions, and the historical records. These records are presented in graphic, alphanumeric, and color forms in accordance with a layout of the primary screen 3. Generally, architecture of the system 1 would differ with regard to the size and complexity. On one hand, a single processing unit could include the processors 13 and 14, the program block 15, the comparator 16, and the clock 17 and a single data base could combine the data bases 9, 12, and 18. On the other hand, each of the data bases 9, 12, and 18 would comprise multiple data bases and multiple processors would be assigned for pre and post processing the input data and the attribute and history screens data.

Figure 2:
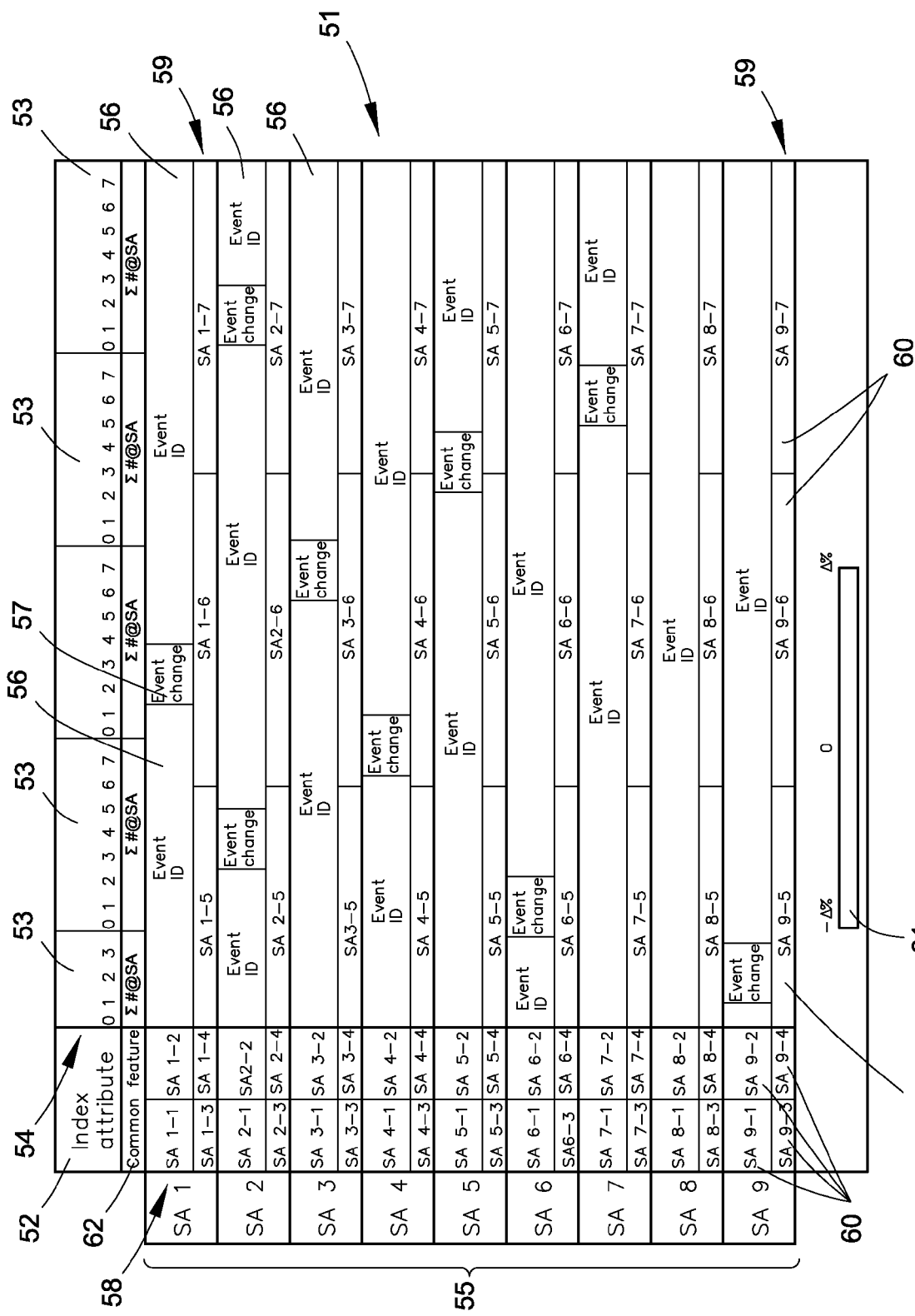
FIG. 2 depicts an embodiment of primary screen layout of the user interface.

Referring to the layout shown in FIG. 2, in one embodiment, the present invention contemplates a graphic window 51 with an index attribute axis 52, a current moment line 54 that represents an absolute zero of the index attribute, and rows of second attributes 55. Although any sequential events could be used as the index attribute, the user defined time duration is expedient for the purpose in most cases and, for convenience, will be further referred to as such. The index attribute axis 52 that further will be referred as time axis 52 generally may be subdivided in segments 53, for example a work week that is divided in days with independent counts of work hours for each day.

Each row 55 presents extrapolated information related to events 56 and event changes 57. Additional information is clustered in attribute sets 58 disposed in the corresponding row 55 outside of the line 54 and attribute sets 59 located along the corresponding row 55 inside (to the right) of the line 54. Individual attributes 60 have generally identical mapping and presentation forms across the sets 58 and 59 for the same kind of events 56.

An integral attribute 61 represents a business objective that is common and understood to all respective users, for example, profitability in relation to a breakeven point. Another example of the integral attribute 61 is an overall quality achieved by the company. A common feature row 62 corresponds to attributes that could not be addressed to the individual row 55. An example of the common feature 62 is an overall number of employees.

Figure 3:
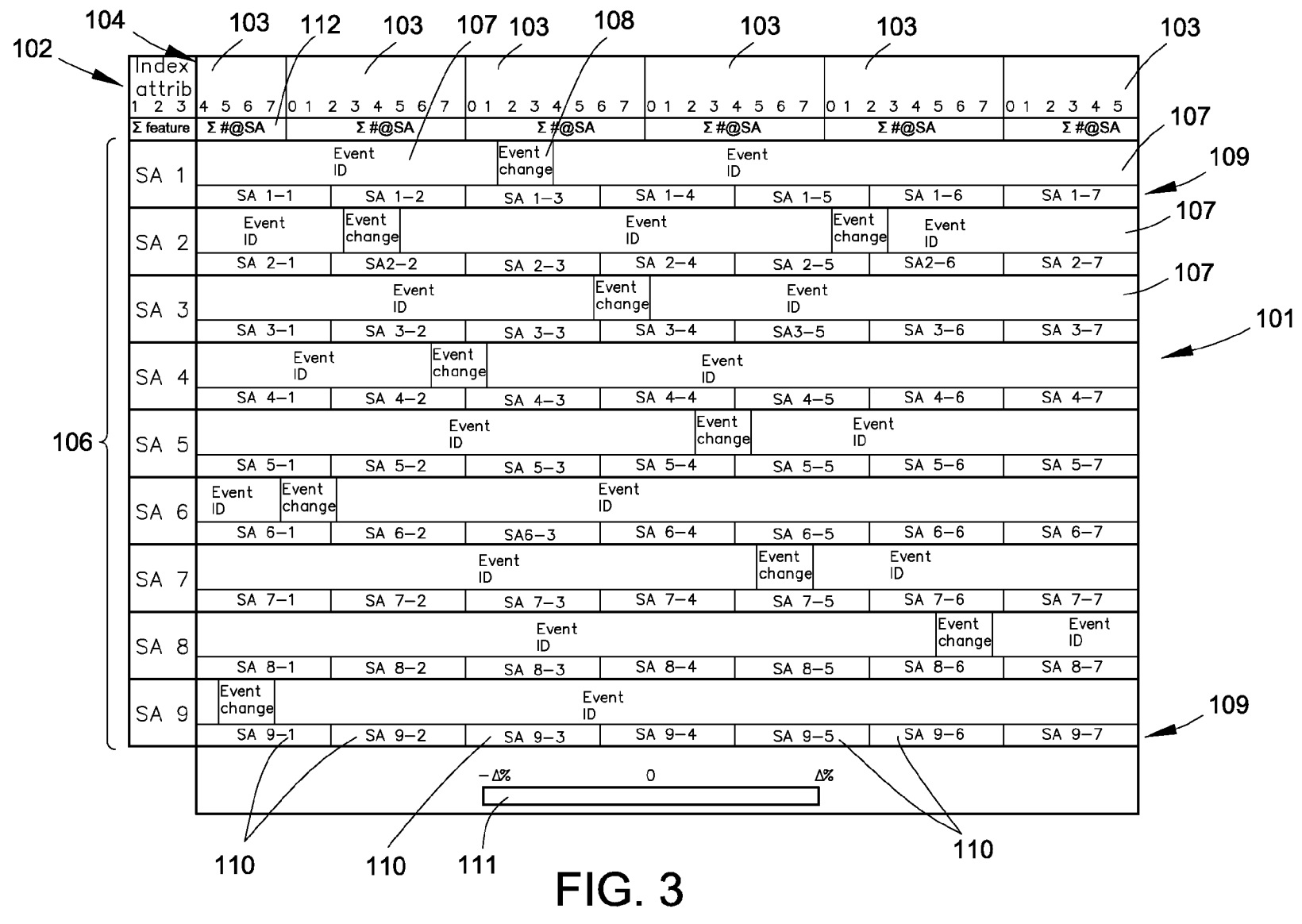

Referring to FIG. 3, in another embodiment of the present invention, the layout comprises a graphic window 101 with a time axis 102 subdivided in segments 103, a zero line 104 representing current moment of time, and rows of second attributes 106. The time axis 102 extends "into the past" to the left of the zero line 104 for clarifying where is the current moment in relation to corresponding segment 103. Each row 106 presents extrapolated information related to events 107 and event changes 108. Additional information is grouped in attribute sets 109 located along the corresponding row 106. Individual attributes 110 have generally identical mapping and presentation forms across the sets 109 for the same kind of events 107. An integral attribute 111 and a common feature row 112 correspond to the integral attribute 61 and the common feature row 62 of FIG. 2 accordingly.

Referring to FIG. 4A, a fragment of the layout of primary screen configuration for production processes comprises a graphic window 201 with a week of work along time axis 202 subdivided in work days 203 and hours of work, a zero line 204 that represents current moment of time (in that example it is approximately lunch time on Monday), and process line rows 205. Each row 205 presents extrapolated information about a progress of orders 206 and setup times 207 for switching from one order to another. Links 209 to the attribute screens are clustered in attribute sets 208 disposed in the corresponding row 205 to the left of the line 204. Individual links 209 have identical mapping and presentation forms in the sets 208. Employee tracking row 210 displays planned and projected number of employees and links to a corresponding attribute screen.

Referring to FIG. 4B, a fragment of the layout of primary screen configuration for materials (in that example they are different plastics used in the production) also comprises a graphic window 301 with a week of work along time axis 302 subdivided in work days 303 and hours of work, a zero line 304 representing current moment of time, and material rows 305. Each row 305 presents extrapolated information about resources of specific material 306 and setup times for switching from one source to another 307. Links 309 to the attribute screens are clustered in attribute sets 308 disposed in the corresponding row 305 to the left of the line 304. Individual links 309 have identical mapping and presentation forms in the sets 308. Storage tracking row 310 displays planned and projected utilization of material storage capacity and links to a corresponding attribute screen.

Referring to FIG. 4C, a fragment of the layout of primary screen configuration for production costs (in that example they are different causes of spending in the course of production) also comprises a graphic window 401 with the time axis 302 subdivided in weeks 403 and days of week, a zero line 404 that represents current moment of time, and source of spending rows 405. Each row 405 displays projected rate of spending on specific resource 406 as compared to planned spending of same. Links 409 to the attribute screens are clustered in attribute sets 408 disposed in the corresponding row 405 to the left of the line 404. Mapping and presentation forms of individual links 409 in the sets 408 are specific to the source of spending. Summary cost deviation row 410 displays projected overall production cost deviation from the planned one and links to a corresponding attribute screen.

One exemplary embodiment of the present invention functions as follows. From the header 4 of the primary screen 3 a user selects the assignment screen 5 wherein, in conjunction with the attribute screens 7, enters information necessary for execution of a new order. This information is collected in the data base 9, processed by the processor 14 and the comparator 16, placed into the history data base 18, and shown on the primary screen 3 as color coded bars representing the change event 57 and/or the event 56. The colors of bars characterize a projected state of the event 56 and the change event 57. Alphanumerical color coded attributes of the event 56 and the change event 57 are superimposed over the bars. The colors of alphanumerical attributes signify certain conditions of the assignment. Choosing the event 56 or the event change 57, by clicking on the corresponding bar for example, aligns the attributes 60 of the corresponding attribute sets 58 and 59 with it. Fields and alphanumerical parts of the attributes 60 are color coded as well according to their current and projected conditions.

When the execution of the assigned new order begins, the virtually real time data from the inputs 11 is collected in the data base 12 and processed by the processor 15. The comparator 16 processes the attributes from the processors 14 and 15 and the history data base 18 in compliance with the scan times of the clock 17, provides the resulting extrapolation to the interface 2 and records of comparison of the planned and virtually real time data to the history data base 18. The colors of the graphical and the alphanumerical attributes of the change events 57, the events 56 and the corresponding attribute sets 58 and 59, chosen at the moment, change concurrently with the comparator 16 records reflecting the change in the predicted conditions. The integral attribute 61 and the attributes of the feature row 62 change likewise.

Referring to FIG. 4A, in a particular embodiment of the present invention, orders LNE-8494514 and SIG-4430010 of the corresponding process lines L1 and L2 are currently in progress. Convention colors of the bars for the events 206 in this example signify following projected order conditions: dark green—finish ahead of planned time, green—finish on time, yellow—finish late, and red—finish unacceptably late. For the change events 207, the colors of the bars are: blue, light blue, orange, and red accordingly. For the attributes 209 of the sets 208, the colors of their fields are: green—original, yellow—edited, and red—either emergency condition or edited unacceptably. Although presenting additional information to the user, changes in style, font, and colors of the superimposed alphanumerical attributes are omitted for simplicity and easy of understanding. Furthermore, the use of flashes in addition to or instead of solid colors, changing text case, and other means of attracting the user attention including sound effects are well known in the art.

If, for example, production of LNE-8494514 slows so the forecasted finish would be late, the color of corresponding part of bar L1 would change from green to yellow and the following setup part of bar L1 would change to orange but, the part of bar L1 corresponding to the next order, in this case CA—2486024, could remain green or would also change to yellow depending on its planned finish time. Further, when the corresponding to LNE-8494514 part of bar L1 clicked on or by other means is chosen by the user, the set 208 displays the attributes 209 also corresponded to LNE-8494514. In this particular scenario, if the production continues at a slower pace, the status field would turn yellow. If the slowing is due to changes in process setup parameters, the corresponding setup field would turn yellow also. Alternatively, if the slowing is due to a decreased quality of the product output, the corresponding product field would turn yellow. If the slowing is due a stop, the corresponding stop reason field turns red. The aforementioned fields, additionally to having superimposed alphanumerical attributes, are the links to the corresponding screens 7 of attribute interface 6 so, by picking the one with an alarming color, the user immediately accesses all relevant information to remedy the situation. In turn, the interface 6 provides access to the corresponding history screens 8 that display past performance data.

Other examples of embodiment of the present invention, although illustrate material resource (FIG. 4B) and production cost (FIG. 4C) management, are similar in structure and function to the production management example (FIG. 4A) disclosed above. There is a number of other primary screen configurations of aforementioned embodiment of the present invention, for example a configuration for equipment and/or facility maintenance, wherein various projected maintenance schedules and activities displayed as the second attributes.

Consequently, the present invention provides the improved method, system, and interface for manufacturing business data management that is equally comprehensive to different users and provides the visual indication of projected results of current activities. Furthermore, the present invention empowers everyone involved in the particular supply chain, saves time by eliminating unnecessary business meetings, and provides for a transparent business with concurrent multifaceted management solutions.

Although the description above contains much specificity, it should not be construed as limiting the scope of the invention but as merely providing illustrations of some of the presently preferred embodiments of this invention. Thus the scope of the invention should be determined by the appended claims and their legal equivalents, rather than by the examples given. It will be apparent to those skilled in the art that various modifications and variations can be made to the above-described structure and methodology without departing from the scope or spirit of the invention.

What is claimed is:

1. A system for managing multi-dimensional data in a manufacturing enterprise comprising:
   a plurality of inputs for entering multi-dimensional data associated with actions performed within a manufacturing enterprise, the plurality of inputs comprise sensors, machine and facility control input and output terminals, and human operators and the multi-dimensional data comprise planned values and actual values;
   computing means for collecting, dynamically updating, and processing said planned and actual values and generating a record of occurrences of events associated with said actions performed within a manufacturing enterprise, said processing of said actual values comprises determining a frequency of said occurrences of events and a change of said frequency of said occurrences of events;
   at least one database for storing and retrieving the multi-dimensional data and the record of occurrences of events;
   means for generating an extrapolated status by projecting future occurrences of events based on the record of occurrences of events and comparison between the planned values and the processed actual values, said extrapolated status communicates said future occurrences of events from a current instant for a preset interval onward; and
   an interface for dynamically presenting the extrapolated status indicating discrepancies between the planned values and the processed actual values, said interface comprising:
   at least one dynamically updated two-dimensional graphic display;
   a first dimension attribute corresponding to a preset interval of first dimension values from a present first dimension value onward;
   an array of second dimension attributes, said second dimension attributes presented in at least graphic form and visually correlated with said first dimension attribute;
   an array of sets of feature attributes presented as data in graphic or alphanumeric forms, said sets of feature attributes associated with said second dimension attributes and at least partially located within boundaries of said second dimension attributes and said data in said alphanumeric form superimposed over said data in said graphic form;
   a plurality of feature displays linked to said feature attributes; and
   means for navigating the displays and data editing,
   wherein said two-dimensional graphic display has a grid comprising plurality of color-coded rows, each row comprising one of said sets of feature attributes.

2. The system of claim 1, wherein the interface is associated with the plurality of inputs and configured with capabilities to alter the planned values.

3. The system of claim 2, wherein the interface is configured to restrict altering of the planned values according to an area of expertise of a user.

4. The system of claim 1, wherein the interface is accessible over a network.

5. The system of claim 1, wherein the interface displays at least a portion of said extrapolated status in predetermined colors corresponding to the discrepancies between the planned values and the processed actual values.

6. The system of claim 1, wherein said first dimension attribute is an index attribute associated with activities within the manufacturing enterprise.

7. The system of claim 1, wherein said array of second dimension attributes comprises a diverse plurality of the second dimensions and said feature attributes generally have identical mapping and presentation forms across said sets of feature attributes associated with a particular variety of said second dimension.

8. The system of claim 1, wherein the second dimension attribute corresponds to a plurality of processes and equipment associated with a predetermined objective within the manufacturing enterprise.

9. The system of claim 1, wherein the second dimension attribute corresponds to one of plurality of resources consumed and/or recycled within the manufacturing enterprise.

10. The system of claim 1, wherein the second dimension attribute corresponds to one of a plurality of transactions associated with a predetermined objective within the manufacturing enterprise.

11. The system of claim 1, comprising at least one integrated attribute associated with a predetermined objective of the manufacturing enterprise.

12. A method for managing multi-dimensional data in a manufacturing enterprise comprising the steps of:
   providing for entering data attributed to functioning of said manufacturing enterprise;
   providing for generating and processing records;
   providing for generating visual presentations;
   generating a set of multi-dimensional data associated with actions to be performed and being performed within the manufacturing enterprise, the multi-dimensional data comprise planned values and actual values;
   generating a record of occurrences of events associated with performing said actions, said generating includes dynamically updating the actual values;
   processing the planned and actual values according to predetermined rules, said processing of said actual values comprises determining a frequency of said occurrences of events and a change of said frequency of said occurrences of events;
   projecting future occurrences of events based on the record of occurrences of events and a comparison between the planned values and the processed actual values; and
   generating a visual representation of an extrapolated status indicating discrepancies between the planned values and the processed actual values, said extrapolated status communicates said future occurrences of events from a current instant for a preset interval onward.

13. The method of claim 12, further comprising altering the planned values in response to the extrapolated status.

14. The method of claim 12, wherein processing the actual values occurs periodically at regular intervals, said actual values comprise a first subset processed at a first interval and a second subset processed at a second interval.

15. The method of claim 12, further comprising a step of generating a historical status report, said historical status report is based on said record of said occurrences of events.

16. The method of claim 12, further comprising a step of generating at least one integrated attribute reflecting a predetermined objective of the manufacturing enterprise.

* * * * *